(12) United States Patent
Böck

(10) Patent No.: US 9,057,274 B2
(45) Date of Patent: Jun. 16, 2015

(54) HOUSING SYSTEM FOR AN AXIAL TURBOMACHINE

(75) Inventor: Alexander Böck, Kottgeisering (DE)

(73) Assignee: MTU Aero Engines GmbH, Munich (DE)

( * ) Notice: Subject to any disclaimer, the term of this patent is extended or adjusted under 35 U.S.C. 154(b) by 415 days.

(21) Appl. No.: 13/574,559

(22) PCT Filed: Jan. 15, 2011

(86) PCT No.: PCT/DE2011/000040
§ 371 (c)(1),
(2), (4) Date: Jul. 20, 2012

(87) PCT Pub. No.: WO2011/088819
PCT Pub. Date: Jul. 28, 2011

(65) Prior Publication Data
US 2012/0301279 A1  Nov. 29, 2012

(30) Foreign Application Priority Data
Jan. 21, 2010 (DE) .......................... 10 2010 005 153

(51) Int. Cl.
*F01D 25/28* (2006.01)
*F01D 9/04* (2006.01)
*F01D 11/00* (2006.01)

(52) U.S. Cl.
CPC .............. *F01D 9/042* (2013.01); *F01D 11/005* (2013.01); *Y02T 50/673* (2013.01); *F05D 2240/11* (2013.01); *F05D 2260/20* (2013.01); *Y02T 50/675* (2013.01)

(58) Field of Classification Search
USPC ........... 415/170.1, 173.1, 209.3, 213.1, 214.1
See application file for complete search history.

(56) References Cited

U.S. PATENT DOCUMENTS 4,194,869 A      3/1980  Corcokios
4,300,868 A  *  11/1981  Wilkinson et al. ............ 415/137
(Continued)

FOREIGN PATENT DOCUMENTS

DE    3126359 A1    7/1982
DE    3309812 A1    9/1984
(Continued)

OTHER PUBLICATIONS

PCT: International Search Report and Written Opinion of PCT/DE2011/000040; Aug. 29, 2011; 10 pages (only the ISR is translated).
(Continued)

*Primary Examiner* — Liam McDowell
(74) *Attorney, Agent, or Firm* — Howison & Arnott LLP

(57) ABSTRACT

The invention relates to a housing system (10) for an axial turbomachine, in particular for an aircraft turbine, comprising a housing (12), at least one guide blade (14), which is fastened to the housing (12) by means of at least one fastening element (18), a scaling element (20) for reducing a leakage flow between the listening element (18) and the housing (12), wherein the sealing element (20) is arranged between a downstream wall (22) of the fastening element (18) with respect to a flow direction (I) of the axial turbomachine and a wall (24) of the housing (12), and a pressing means (36), by means of which an axial force can be applied to the scaling element (20) And the scaling element can be pressed against the wall (24) of the housing (12), at least during the operation of the axial turbomachine. The invention further relates to an axial turbomachine having such a housing system (10).

6 Claims, 3 Drawing Sheets

(56) References Cited

U.S. PATENT DOCUMENTS

| | | | |
|---|---|---|---|
| 4,425,078 A | | 1/1984 | Robbins |
| 4,720,236 A | | 1/1988 | Stevens |
| 5,192,185 A | * | 3/1993 | Leonard ............... 415/170.1 |
| 5,338,152 A | | 8/1994 | Feldmann |
| 6,062,813 A | * | 5/2000 | Halliwell et al. ......... 415/174.5 |
| 6,095,750 A | * | 8/2000 | Ross et al. ............... 415/189 |
| 6,164,656 A | | 12/2000 | Frost |
| 6,464,457 B1 | | 10/2002 | Morgan et al. |
| 7,037,071 B2 | * | 5/2006 | Antunes et al. ............. 415/189 |
| 2004/0067131 A1 | | 4/2004 | Joslin |
| 2004/0239050 A1 | | 12/2004 | Antunes et al. |
| 2007/0284832 A1 | | 12/2007 | Wunderlich et al. |
| 2009/0010758 A1 | * | 1/2009 | Wunderlich ............... 415/214.1 |
| 2009/0129917 A1 | | 5/2009 | Hazevis et al. |
| 2009/0169369 A1 | | 7/2009 | Morgan et al. |

FOREIGN PATENT DOCUMENTS

| | | |
|---|---|---|
| DE | 3541606 A1 | 6/1986 |
| DE | 4006498 A1 | 1/1991 |
| DE | 4215440 A1 | 11/1993 |
| DE | 4324035 A1 | 1/1995 |
| DE | 60203574 | 2/2006 |
| DE | 102006017377 A1 | 11/2007 |
| DE | 102007059220 A1 | 6/2009 |
| EP | 1849965 A2 | 10/2007 |

OTHER PUBLICATIONS

German Patent and Trademark Office; German Search Report; Aug. 10, 2010; 4 pages.

* cited by examiner

HOUSING SYSTEM FOR AN AXIAL TURBOMACHINE

CROSS-REFERENCE TO RELATED APPLICATIONS

This application is a U.S. National Phase application submitted under 35 U.S.C. §371 of Patent Cooperation Treaty application serial no. PCT/DE2011/000040, filed Jan. 15, 2011, and entitled HOUSING SYSTEM FOR AN AXIAL TURBOMACHINE, which application claims priority to German patent application serial no. 10 2010 005 153.5, filed Jan. 21, 2010, and entitled GEHÄUSESYSTEM FÜR EINE AXIALSTRÖMUNGSMASCHINE.

Patent Cooperation Treaty application serial no. PCT/DE2011/000040, published as WO 2011/088819, and German patent application serial no. 10 2010 005 153.5, are incorporated herein by reference.

TECHNICAL FIELD

The invention relates to a housing system for an axial turbomachine as well as to an axial turbomachine with such a housing system.

BACKGROUND

Housing systems for axial turbomachines such as, for example, airplane turbines comprise a housing in which vanes are customarily arranged in a crown shape. These vanes, that form a so-called "vane cluster", should be sealed as pressure-tight as possible against the housing in order to avoid unnecessary flow losses during the operation of the associated axial turbomachine. However, large thermal gradients with correspondingly high loads in the area of the rear closing wall occur in the case of vane clusters with a large circumferential extension and a high closing wall. Therefore, after a certain size of the housing and/or of the vanes a continuous closing wall is no longer possible, so that the vanes are fastened by individual fastening elements on the housing. Such a housing system can be gathered, for example, from U.S. Pat. No. 4,194,869.

However, comparatively many slots are produced between the fastening elements and the housing by this type of fasting, which slots must be sealed by a sealing element in order to reduce the leakage flows occurring during operation. For example, sealing platelets (so-called "leaf seals") or sealing rings that surround the outer vane feet are known from the prior art.

However, these known sealing elements are considered to have the disadvantageous circumstance that they are relatively expensive and complicated to mount and that their sealing action frequently weakens during the operation of the axial turbomachine. This leads to a reduced effectiveness and to a correspondingly elevated fuel requirement.

SUMMARY AND DESCRIPTION

The present invention has the task of creating a housing system of the initially cited type that ensures a uniformly high sealing action during the operation of an associated axial turbomachine.

The invention solves the task with the housing system with the features as described and claimed as well as within axial turbomachine as described and claimed with such a housing system. Advantageous embodiments with purposeful further developments of the invention are indicated in the subclaims, whereby advantageous embodiments of the housing system are to be considered as advantageous embodiments of the axial turbomachine and vice versa.

A housing system in accordance with the invention for an axial turbomachine, in particular for an airplane turbine, comprises a housing, at least one vane that is fastened on the housing by at least one fastening element, a sealing element for reducing a leakage flow between the fastening element and the housing, whereby the sealing element is arranged between a fastening element wall located downstream relative to a direction of flow of the axial turbomachine and between a wall of the housing, and comprises a pressure means by means of which the sealing element can be loaded with an axial force at least during the operation of the axial turbomachine and can be pressed against the wall of the housing. It is ensured in this manner that the sealing element is pressed against the housing wall acting as a sealing contact surface with the aid of the pressure means, as result of which a very high and uniform sealing action is ensured during the operation of the axial turbomachine. In addition, the housing system can be economically produced and readily mounted so that corresponding advantages of cost result in the production as well as in the maintenance, repair and overhauling.

An advantageous embodiment of the invention provides that the sealing element is slotted and/or annular and/or multipartite and/or elastically deformable. A slotted sealing element advantageously facilitates the assembly on account of its increased mobility. Since the sealing element is annular, the improved sealing action can be ensured over the entire circumference of the housing. It can be provided that the sealing element is in one part or multipartite, for example, in the form of several annular segments, which creates an elevated constructive freedom. Since the sealing element can be elastically deformed, the sealing element can undulate, so that a tolerance compensation is readily ensured in the circumferential direction of the housing and therefore a continuous contact of the sealing element on the wall is ensured.

Further advantages result if the fastening element has a hook-shaped area that is arranged in an associated receptacle of the housing. This makes possible a simple mounting and dismounting of the at least one vane on the housing.

In a further embodiment of the invention it proved to be advantageous if the fastening element is arranged on a radially outer blade foot of the vane since in this manner the aerodynamic properties of the at least one vane are not adversely affected. In addition, the fastening element in axial turbomachines constructed as airplane turbines is arranged as a consequence on a side facing away from the hot gas and is exposed to lesser thermal loads during operation.

In a further advantageous embodiment of the invention the sealing element comprises at least one through opening, in particular a metering bore, by means of which a flow of cool air can be adjusted between a space of the housing system that is arranged upstream from the fastening element and between a space of the housing element arranged downstream from the fastening element. On account of the high tightness a flow of cool air necessary for the operation of the particular associated axial turbomachine can be very precisely adjusted via the through opening. This can advantageously save cooling air and improve the effectiveness of the axial turbomachine.

Further advantages result in that the pressure means is constructed as a pressure edge on the fastening element. As a result of such a design of the pressure means the sealing element is pressed during the operation of the associated axial turbomachine against the housing wall via the forces of the operating fluid acting on the at least one vane with an axial force applied via the fastening element by the pressure edge, which achieves a contact that is safe in operation and an especially high sealing action in a constructively simple manner.

In another advantageous embodiment of the invention a groove is provided in which a radially inner end area of the sealing element is arranged. This makes possible an arrangement of the sealing element that is especially secure in operation and against falling out. Furthermore, as a consequence, a wall of the groove can also act as a sealing contact surface against which the sealing element is pressed with the aid of the pressure means at least during the operation of the associated fastening element. This further improves the sealing action.

It proved to be advantageous if the groove is designed to be oblique. In this manner the sealing element in the oblique groove is supported against undesired tilting, which further improves the operational security of the housing system.

In a further embodiment the groove is arranged offset relative to the pressure means. In other words, the groove is not in alignment with the pressure means. In this manner an especially reliable contact of the sealing element on the housing wall and on a wall of the groove is ensured, which results in an especially high sealing action under all operating conditions of the axial turbomachine.

Another advantageous embodiment of the invention provides that the groove is formed by corresponding recesses in the fastening element and in the vane. As a result, the groove can advantageously be constructed after the fastening of the fastening element and of the at least one vane on the housing—for example, by milling—in one method step. In this manner any offset between the recess of the fastening element and the corresponding recess of the vane is avoided. Alternatively, it can also be provided that the recesses are manufactured during the manufacture of the fastening element and/or of the vanes already—for example by separation and/or by master patterning.

In another advantageous embodiment of the invention several vanes are provided that are arranged in the form of a vane crown on the housing. As a result the housing system makes possible a purposeful influencing of the flow in an associated axial turbomachine so that the operating fluid of the axial-machine can strike rotor blades arranged downstream from the vane crown at an optimal angle. This achieves, together with the improved sealing action, a significantly heightened effectiveness of the axial turbomachine.

It turned out to be advantageous in a further embodiment if the vane crown comprises several vane elements, whereby each vane segment is fastened by at least two fastening elements on the housing. This makes possible a rapid, simple and stable fastening of the vanes on the housing of the housing system.

Another aspect of the invention relates to an axial turbomachine, in particular an airplane turbine, that comprises a housing system in accordance with one of the previous exemplary embodiments. This ensures a high sealing action during the operation of the axial turbomachine, which results in a correspondingly improved effectiveness of the axial turbomachine. The further features and their advantages resulting from the above can be gathered from the previous descriptions.

It furthermore turned out to be advantageous if at least one rotor blade is arranged upstream and/or downstream from the vane. This allows a constructively flexible adaptability of the axial turbomachine to different uses and construction forms.

Another advantageous embodiment of the invention provides that the housing of the housing system comprises at least one seal, in particular an inlet seal and/or a honeycomb seal for reducing a leakage flow between the housing and a blade tip of the at least one rotor blade. The effectiveness of the axial turbomachine is additionally raised with the aid of such a seal.

BRIEF DESCRIPTION OF THE DRAWINGS

Further features of the invention result from the claims, the exemplary embodiment as well as from the drawings. The features and feature combinations cited in the previous specification as well as the features and feature combinations cited subsequently in the exemplary embodiment can be used not only in the particular indicated combination but also in other combinations or by themselves without leaving the scope of the invention. In the figures:

DETAILED DESCRIPTION

Figure 1:
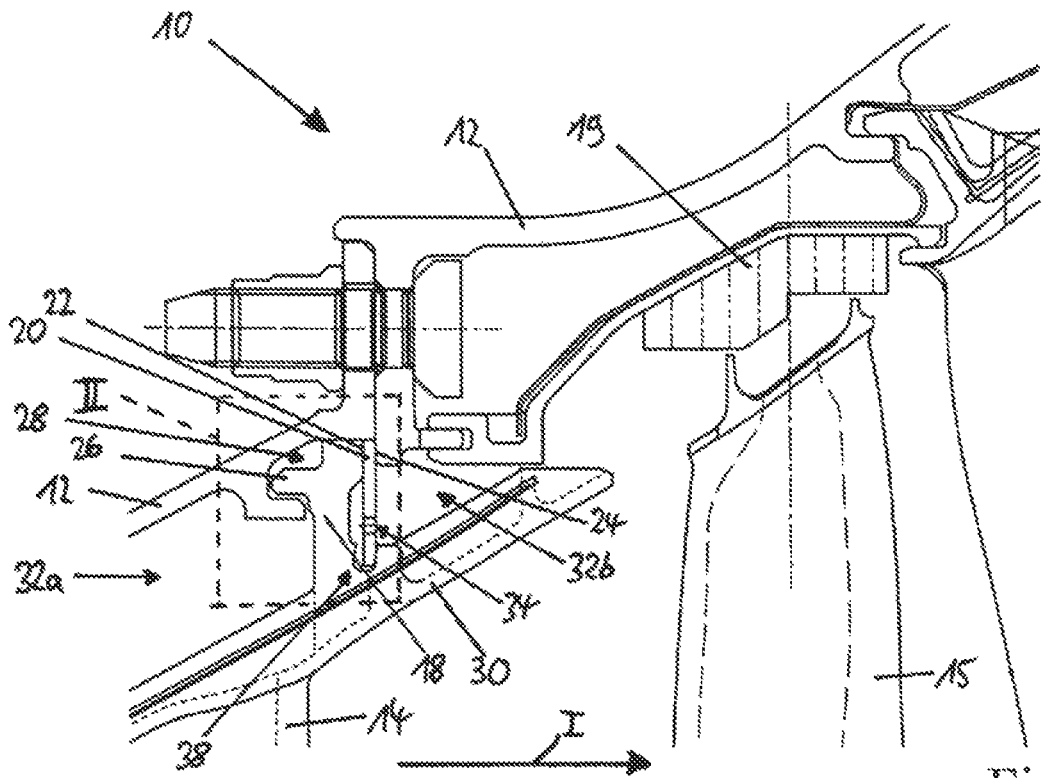
FIG. 1 shows a schematic lateral cutaway portion of a housing system in accordance with the invention.
Figure 2:
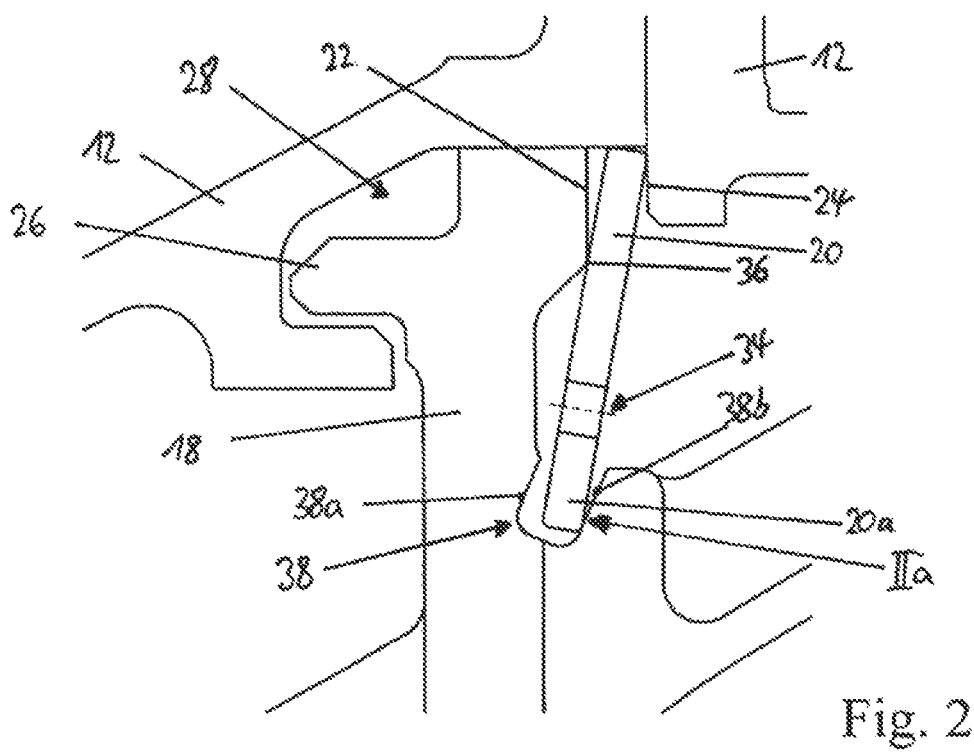
FIG. 2 shows a schematic lateral sectional view, increased relative to the arrangement of the sealing element, of the detail II shown in FIG. 1.

FIG. 1 shows a schematic lateral cutaway portion of an exemplary embodiment of a housing system 10 in accordance with the invention for an axial turbomachine constructed as an airplane turbine (not shown). FIG. 1 is explained in the following viewed together with FIG. 2. For its part, FIG. 2 shows a schematic lateral sectional view of the detail II, whereby the arrangement of the sealing element is shown in an increased manner for a more detailed illustration. The housing system 10 comprises a multi-partite housing 12 and a plurality of vanes 14 of which several are combined on a common platform to vane segments 16 (see FIG. 3). For their part, the individual vane segments 16 are arranged inside the housing 12 in the form of a vane crown 17 as a so-called "vane cluster". The vanes 14 can be constructed basically fixed and/or adjustable. The vanes 14 and/or the vane segments 16 are fixed on the housing 12 by fastening elements 18 described in detail in the following.

A rotor blade ring (not shown) comprising several rotor blades 15 is arranged inside the housing 12 of the housing system 10 in the present exemplary embodiment relative to a direction of flow I of the axial turbomachine downstream from the vanes 14. In order to reduce a leakage flow between the housing 12 and the blade tips of the rotor blades 15, the housing 12 of the housing system 10 comprises a seal 19 constructed in the present case as a known inlet seal.

In order to reduce a leakage flow between the fastening elements 18 and the housing 12 a static sealing element 20 is provided that is arranged between a wall 22 of the fastening element 18, which wall is located downstream relative to the direction of flow I of the axial turbomachine, and between a wall 24 of the housing 12. The wall 24 of the housing 12 thus functions as an axial sealing contact surface rotating in the circumferential direction of the housing 12. The sealing element 20 is slotted in the present exemplary embodiment and constructed in a multi-partite manner in the form of annular segments. Furthermore, the sealing element 20 can be elastically deformed, as a result of which it can deform in an undulating manner between adjacent fastening elements 18 and makes reliable contact (cf. FIG. 6). To this end the sealing element 20 can be manufactured, for example, from a springy, elastic, temperature-stable and/or metallic material. Instead of the multi-partite construction in the form of annular segments shown, it can alternatively be provided that the sealing element 20 is constructed in one part—for example, annularly. The sealing element 20 is clamped in a manner explained in detail in the following during the operation of the airplane turbine by the gaseous forces occurring on the vanes 14 so that an especially high and operationally secure sealing effect is achieved in a simple and economical manner.

As can be well recognized in particular in FIG. 2, the fastening element 18 has a hook-shaped area 26 arranged in an associated receptacle 28 of the housing 12. This achieves a positive connection with a low installation height, whereby the shape of the receptacle 28 and the shape of the fastening element 18 are coordinated with one another. In addition, the vanes 14 can be readily mounted on the housing 12 and dismounted from this housing as a result. Each fastening element 18 is arranged on a radially outer blade foot 30 of the particular vane 14. In addition to the support of the vanes 14, another important function of the blade feet 30 consists in the sealing action relative to a rotor of the axial turbomachine in order to avoid a recirculation of the compressed air from a chamber 32a with a rather high pressure into a chamber 32b with a rather low pressure. Due to the high tightness the sealing element 20 has several through openings 34 distributed over the circumference and constructed as metering bores (cf. FIG. 3) by means of which openings a flow of cooling air can be adjusted between the space 32a with a higher pressure located upstream from the fastening element 18 and between the space 32b of the housing system 10, which space 32b is located downstream from the fastening element 18. In this manner the necessary flow of cooling air can be very precisely adjusted so that cooling air is saved and the effectiveness of the airplane turbine is additionally improved.

As can be recognized in particular in FIG. 2 the fastening element 18 comprises a pressure means 36 constructed in the present instance as a pressure edge bordering the wall 22. Furthermore, the fastening element 18 comprises an oblique groove 38 in which a radially inner end area 20a of the sealing element is arranged. The groove 38 is offset, viewed in the direction of flow I, relative to the pressure means 36 and is therefore not in alignment with the wall 22 of the fastening element 18. The groove 38 is formed in the present exemplary embodiment by two corresponding recesses 38a, 38b. The recess 38a is formed in the fastening element 18 and the recess 38b in the vane 14, whereby the recess 38b functions together with the wall 24 of the housing 12 as a sealing contact surface. In other words, the groove 38 is constructed relative to the sealing element 20 in the area IIa with a "covering", as a result of which the sealing element 20 is clamped between the fastening element 18, the housing 12 and the recess 38b of the vane 14 and the pressure means 36 can exert an especially large axial pressure force on the sealing element 20. Thus, the sealing element 20 is pressed by the axial force of the vanes 14 acting parallel to the direction of flow I via the pressure edge 36 against the wall 24 of the housing 12, which wall serves as axial sealing contacts, and against the wall of the recess 38b. The support is conceived in such a manner with the cited covering that the sealing element 20 rests completely on the walls 24 and 38b. The groove 38 is tilted in such a manner in the present case for manufacturing reasons that the pressure edge 36 makes possible the subsequent manufacture of the groove 38 after the fixing of the fastening element 18 on the housing 12 by a milling or grinding procedure.

Figure 3:
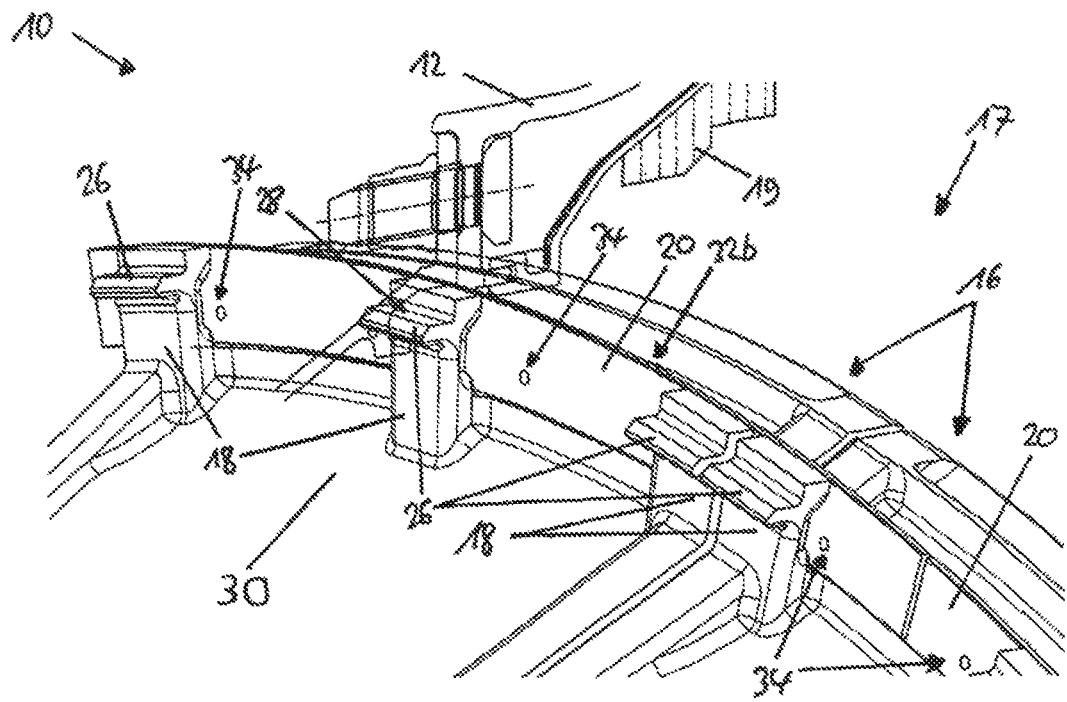
FIG. 3 shows a schematic perspective view in a cutaway portion of the housing system shown in FIG. 1.

FIG. 3 shows a schematic and cutout perspective view of the housing system 10 shown in FIG. 1, whereby the housing 12 is illustrated only in a transparent sectional view for reasons of clarity. In particular the annular, segmental sealing element 20 can be well recognized with the through openings 34. It can furthermore be recognized that each ring segment 16 is connected by several fastening elements 18 to the housing 12.

Figure 4:
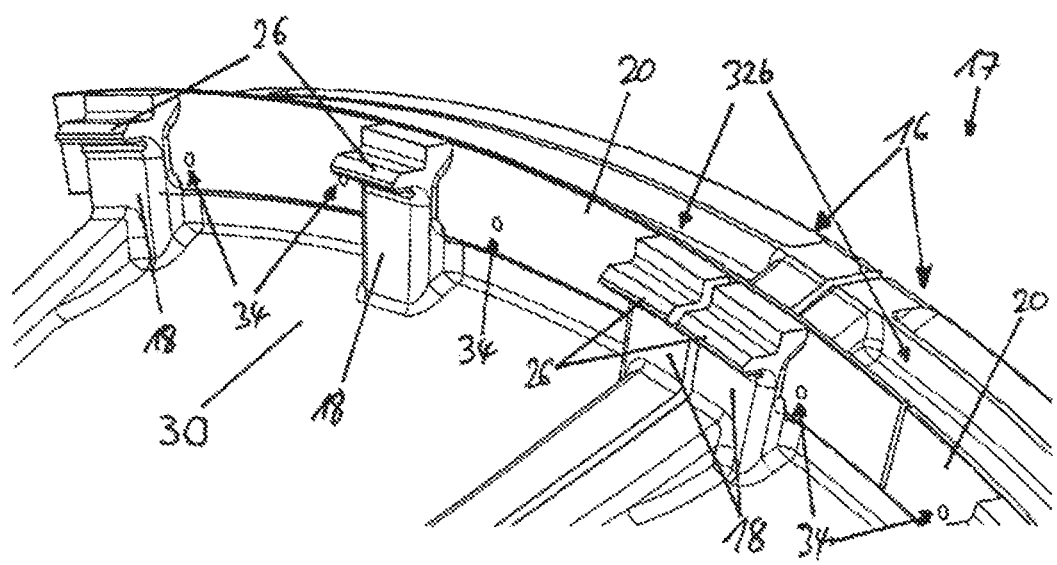
FIG. 4 shows a schematic perspective view in a cutaway portion of a vane crown shown in FIG. 3.
Figure 5:
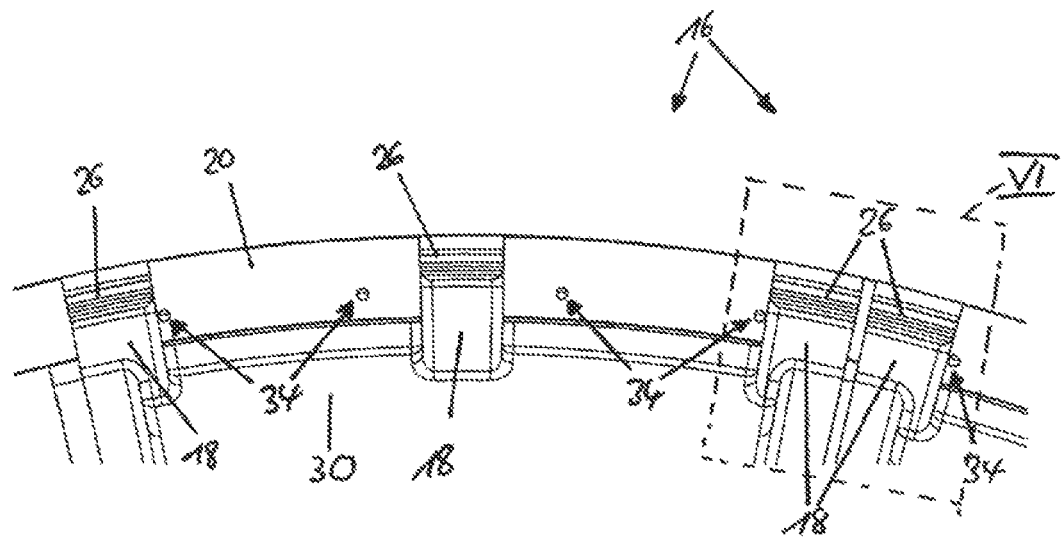
FIG. 5 shows a schematic front view in a cutaway portion of the vane crown shown in FIG. 3 and FIG. 4.

FIG. 4 shows a schematic and cutout perspective view of the vane crown 17 shown in FIG. 3 without the housing 12 for further clarification. In a corresponding manner, FIG. 5 shows a schematic and cutout frontal view of the vane crown 17 shown in FIG. 3 and FIG. 4 in the direction of flow I. It is apparent here that the abutment areas of the individual vane segments 16 and of the annular segments of the sealing element 20 are offset relative to each other in the circumferential direction in order to ensure a high sealing action even under fluctuating temperature conditions.

Figure 6:
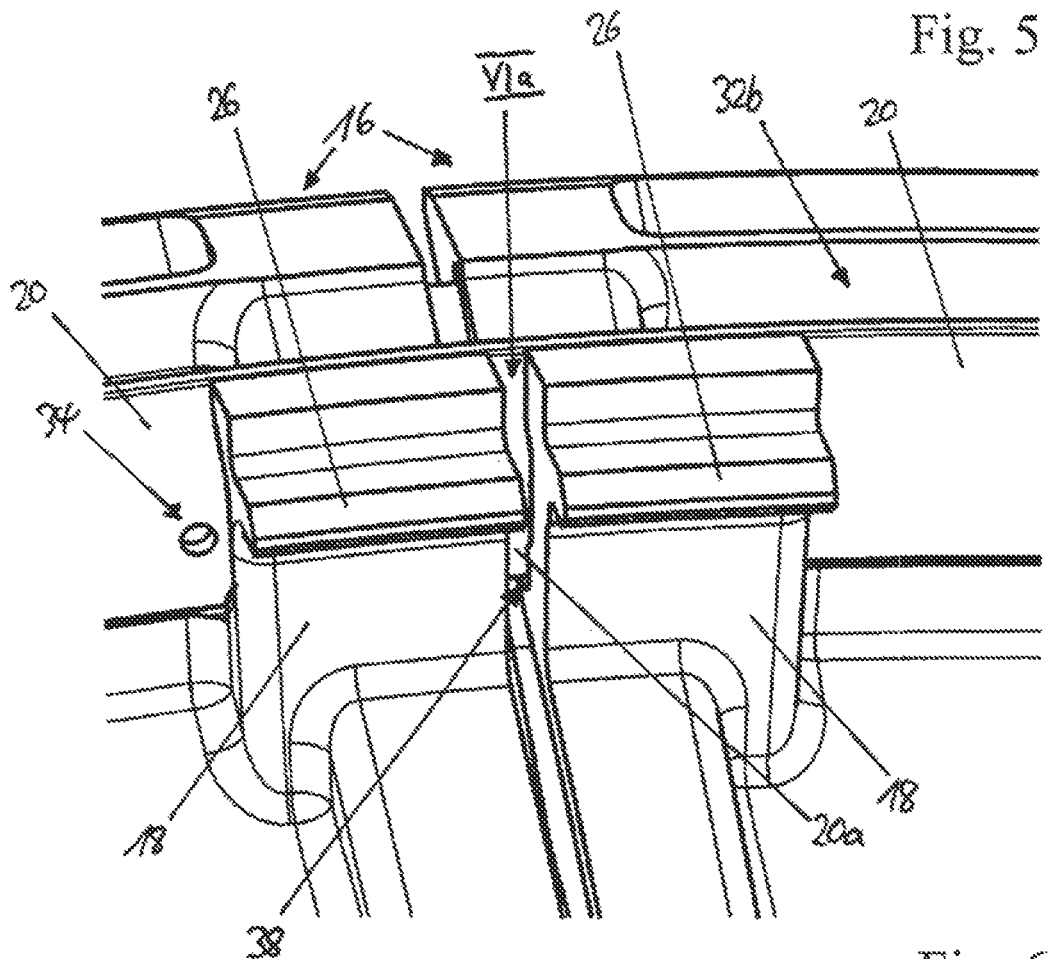
FIG. 6 shows a schematic perspective view of the detail VI shown in FIG. 5.

FIG. 6 shows a schematic perspective view of the detail VI shown in FIG. 5. In particular, the space 32b with a lower pressure as well as the abutment area between two vane segments 16 are recognizable. Furthermore, the arrow VIa characterizes an area between two adjacent fastening elements 18 in which the elastic sealing element 20 is deformed in an undulating manner in the circumferential direction so that it rests completely on the wall 24 and the wall of the recess 38b.

The invention claimed is:
1. A housing system for an axial turbomachine having a defined direction of flow, the housing system comprising:
   a housing including
      a first wall portion configured as a receptacle facing downstream relative to the direction of flow and
      a second wall portion disposed downstream relative to the direction of flow from the first wall portion and facing upstream relative to the direction of flow;
   at least one vane that is fastened on the housing by at least one fastening element, the fastening element including
      a hook-shaped portion extending upstream relative to the direction of flow and configured to be received in the downstream-facing receptacle of the first wall portion of the housing,
      a first wall of the fastening element facing downstream relative to the direction of flow and
      a pressure edge portion bordering the first wall of the fastening element and facing downstream relative to the direction of flow; and
   a sealing element having a radially outer end disposed between the downstream-facing first wall of the fastening element and the upstream-facing second wall portion of the housing;
   whereby the housing, vane and sealing element define a first air chamber disposed upstream from the fastening element with a relatively high pressure therein during the operation of the turbomachine and a second air chamber disposed downstream from the fastening element with a relatively low pressure therein during the operation of the turbomachine;
   whereby the pressure edge portion of the fastening element is in contact with the sealing element and loads the sealing element with an axial force at least during the operation of the turbomachine so that the radially outer end of the sealing element is pressed against the upstream-facing second wall portion of the housing wall of the housing; and whereby the sealing element reduces leakage flow between the fastening element and the housing; and wherein the sealing element further comprises at least one metering bore formed therethrough, by means of which a flow of cooling air can be adjusted between the first air chamber of the housing system that is disposed upstream from the fastening element and the second air chamber of the housing element that is disposed downstream from the fastening element.

2. A housing system for an axial turbomachine having a defined direction of flow, the housing system comprising:
a housing including
a first wall portion configured as a receptacle facing downstream relative to the direction of flow and
a second wall portion disposed downstream relative to the direction of flow from the first wall portion and facing upstream relative to the direction of flow;
at least one vane that is fastened on the housing by at least one fastening element, the fastening element including
a hook-shaped portion extending upstream relative to the direction of flow and configured to be received in the downstream-facing receptacle of the first wall portion of the housing,
a first wall of the fastening element facing downstream relative to the direction of flow and
a pressure edge portion bordering the first wall of the fastening element and facing downstream relative to the direction of flow; and
a sealing element having a radially outer end disposed between the downstream-facing first wall of the fastening element and the upstream-facing second wall portion of the housing;
whereby the housing, vane and sealing element define a first air chamber disposed upstream from the fastening element with a relatively high pressure therein during the operation of the turbomachine and a second air chamber disposed downstream from the fastening element with a relatively low pressure therein during the operation of the turbomachine;
whereby the pressure edge portion of the fastening element is in contact with the sealing element and loads the sealing element with an axial force at least during the operation of the turbomachine so that the radially outer end of the sealing element is pressed against the upstream-facing second wall portion of the housing wall of the housing; and
whereby the sealing element reduces leakage flow between the fastening element and the housing; and
further comprising:
a second wall of the fastening element facing downstream relative to the direction of flow and disposed on the fastening element such that the pressure edge portion is disposed between the first and second walls of the fastening element; and
a groove formed on the second wall of the fastening element, within which groove a radially inner end of the sealing element is received.

3. A housing system in accordance with claim 2, wherein the groove on the second wall of the fastening element is offset in the upstream direction relative to the direction of flow with respect to the pressure edge portion of the fastening element.

4. A housing system for an axial turbomachine, the housing system comprising:
a housing;
at least one vane that is fastened on the housing by at least one fastening element;
a sealing element for reducing a leakage flow between the fastening element and the housing, whereby the sealing element is arranged between a fastening element wall located downstream relative to a direction of flow of the axial turbomachine and between a wall of the housing; and
with a pressure feature by means of which the sealing element can be loaded with an axial force at least during the operation of the axial turbomachine and can be pressed against the wall of the housing; and
wherein the sealing element comprises at least one through opening by means of which a flow of cool air can be adjusted between a first space of the housing system that is arranged upstream from the fastening element and a second space of the housing system that is arranged downstream from the fastening element.

5. A housing system for an axial turbomachine, the housing system comprising:
a housing;
at least one vane that is fastened on the housing by at least one fastening element;
a sealing element for reducing a leakage flow between the fastening element and the housing, whereby the sealing element is arranged between a fastening element wall located downstream relative to a direction of flow of the axial turbomachine and between a wall of the housing; and
with a pressure feature by means of which the sealing element can be loaded with an axial force at least during the operation of the axial turbomachine and can be pressed against the wall of the housing; and
further comprising a groove provided on the fastening element in which a radially inner end area of the sealing element is arranged; and
wherein the groove is configured so as to be oblique.

6. A housing system for an axial turbomachine, the housing system comprising:
a housing;
at least one vane that is fastened on the housing by at least one fastening element;
a sealing element for reducing a leakage flow between the fastening element and the housing, whereby the sealing element is arranged between a fastening element wall located downstream relative to a direction of flow of the axial turbomachine and between a wall of the housing; and
with a pressure feature by means of which the sealing element can be loaded with an axial force at least during the operation of the axial turbomachine and can be pressed against the wall of the housing; and
further comprising a groove provided on the fastening element in which a radially inner end area of the sealing element is arranged; and
wherein the groove is configured so as to be offset relative to the pressure feature.

* * * * *